United States Patent [11] 3,598,474

| [72] | Inventor | Arthur H. Shoemaker<br>East Aurora, N.Y. |
|---|---|---|
| [21] | Appl. No. | 20,734 |
| [22] | Filed | Mar. 18, 1970 |
| [45] | Patented | Aug. 10, 1971 |
| [73] | Assignee | American Optical Corporation<br>Southbridge, Mass. |

[54] OIL-IMMERSION-TYPE MICROSCOPE OBJECTIVE
2 Claims, 1 Drawing Fig.

[52] U.S. Cl. ......... 350/176,
350/175 ML, 350/177, 350/214, 350/216
[51] Int. Cl. ......... G02b 9/60,
G02b 21/02

[50] Field of Search......... 350/176, 177, 214—216

[56] References Cited
UNITED STATES PATENTS
3,437,398 4/1969 Muller et al. ......... 350/216 X
3,497,290 2/1970 Rosenberger ......... 350/216 X

*Primary Examiner*—John K. Corbin
*Attorneys*—William C. Nealon, Noble S. Williams and Robert J. Bird ABSTRACT: A five-member microscope objective having a numerical aperture of substantially 1.25 and a magnification of substantially 100 ×.

PATENTED AUG 10 1971 3,598,474
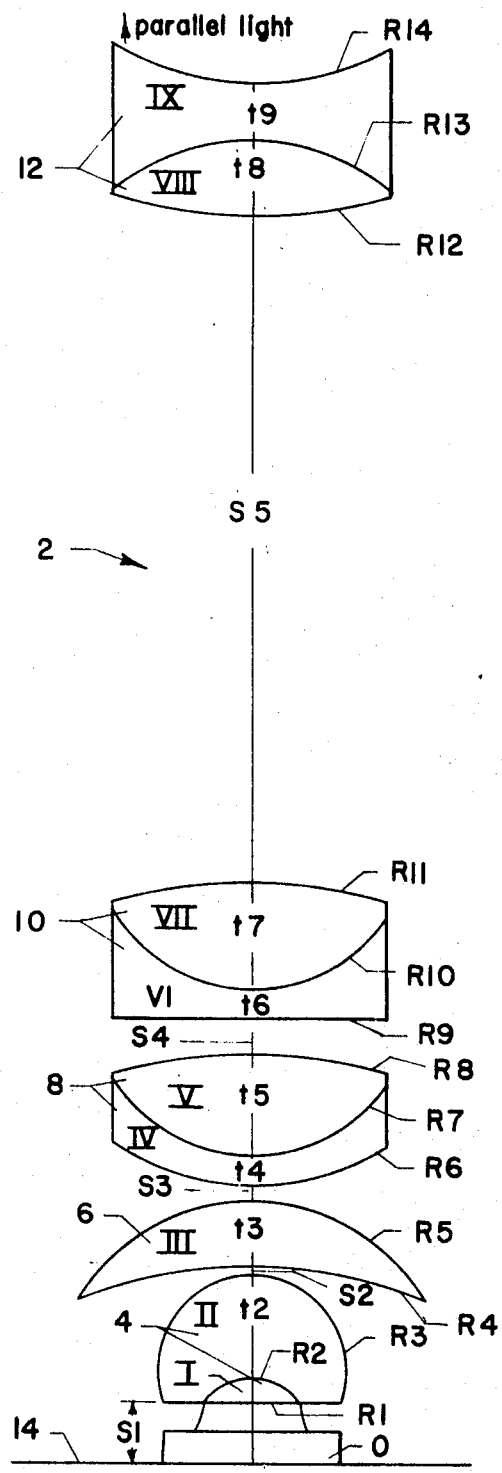
INVENTOR.
ARTHUR H. SHOEMAKER
BY
Robert J. Bird
ATTORNEY

OIL-IMMERSION-TYPE MICROSCOPE OBJECTIVE

BACKGROUND OF THE INVENTION

The present invention relates to a microscope objective, and in particular to an achromatic oil immersion microscope objective.

An object of the present invention is to provide an achromatic microscope objective having a numerical aperture of substantially 1.25 and a magnification of substantially 100X, in which chromatic and spherical aberrations, coma, and astigmatism are well corrected while providing a substantially flat image field when used with a telescope objective as described in U.S. Pat. No. 3,355,234, and without using calcium fluoride.

DRAWING

In the drawing, a microscope objective is represented by a plurality of lenses viewed transversely their axis.

DESCRIPTION

Referring now to the drawing, a microscope objective is shown at 2. It includes a front doublet 4, a single lens 6, a doublet 8, a doublet 10, and a doublet 12, all of said lenses being in axial alignment. Objective 2 is disposed relative to an object plane 14 as shown in the drawing. A capillary oil space exists between plane 14 (or object O thereon) and doublet 4.

Positive doublet 4 includes a planoconvex lens I and a concavo-convex lens II. Lens 6 is a concavo-convex positive meniscus lens, also designated as III. Doublet 8 includes a convex-concavo lens IV and a double convex lens V together forming a positive double convex doublet. Doublet 10 includes a convex-concavo lens VI and a double convex lens VII, together forming a negative double convex doublet. Doublet 12 includes a double convex lens VIII and a double concave lens IX, together forming a negative convex-concavo doublet.

The lens parameters are as follows: The successive lens radii are designated R1—R14 where a minus sign indicates radii on centers of curvature lying on the object side of their vertices. The axial thicknesses of successive lens elements are designated T1—T9. The successive axial spaces from the object plane are designated S1—S5. The refractive indices of the successive lens elements are designated ND1—ND9. The Abbe numbers of the successive lens elements are designated $\nu 1 - \nu 9$ respectively.

The above-mentioned parameters are related to the focal length according to the following constructional data:

[Magnification=100X  N.A.=1.25]

| Lens | Radius (R) | Thickness (T) | Space (S) | Refractive index (ND) | Abbé Number ($\nu$) |
|---|---|---|---|---|---|
| I | R1=Plano | T1=.3173F | S1=.1696F | ND1=1.51700 | $\nu 1$=64.54 |
| | R2=—.9047F | | | | |
| II | R3=—1.5254F | T2=1.5971F | | ND2=1.96028 | $\nu 2$=34.92 |
| III | R4=—6.1208F | T3=1.1183F | S2=.0109F | ND3=1.78833 | $\nu 3$=50.47 |
| | R5=—3.3808F | | | | |
| IV | R6=8.7525F | T4=.6702F | S3=.1641F | ND4=1.80491 | $\nu 4$=25.42 |
| | R7=4.4548F | | | | |
| V | R8=—4.4548F | T5=2.5595F | | ND5=1.48651 | $\nu 5$=84.46 |
| VI | R9=14.2190F | T6=.6374F | S4=.0279F | ND6=1.80491 | $\nu 6$=25.42 |
| | R10=3.1849F | | | | |
| VII | R11=—13.3123F | T7=2.7756F | | ND7=1.48651 | $\nu 7$=84.46 |
| VIII | R12=31.4373F | T8=1.1676F | S5=8.3214F | ND8=1.75496 | $\nu 8$=27.57 |
| | R13=—3.4557F | | | | |
| IX | R14=4.2715F | T9=.9887F | | ND9=1.61328 | $\nu 9$=44.28 |

The foregoing parameters of radius, thickness and space are based on the value of F. The value of F in this case, as an example, is 1.8277 millimeters. Given in numbers, the foregoing data is as follows:

[F=1.8277  Magnification=100X  N.A.=1.25]

| Lens | Radius (R) | Thickness (T) | Space (S) | Refractive index (ND) | Abbé Number ($\nu$) |
|---|---|---|---|---|---|
| I | R1=Plano | T1=.58 | S1=.31 | ND1=1.517 | $\nu 1$=64.54 |
| | R2=—1.6535 | | | | |
| II | R3=—2.788 | T2=2.919 | | ND2=1.96028 | $\nu 2$=34.92 |
| III | R4=—11.187 | T3=2.044 | S2=.02 | ND3=1.73833 | $\nu 3$=50.47 |
| | R5=—6.179 | | | | |
| IV | R6=15.997 | T4=1.225 | S3=.300 | ND4=1.80491 | $\nu 4$=25.42 |
| | R7=8.142 | | | | |
| V | R8=—8.142 | T5=4.678 | | ND5=1.48651 | $\nu 5$=84.46 |
| VI | R9=25.988 | T6=1.165 | S4=.051 | ND6=1.80491 | $\nu 6$=25.42 |
| | R10=5.821 | | | | |
| VII | R11=—24.331 | T7=5.073 | | ND7=1.48651 | $\nu 7$=84.46 |
| VIII | R12=57.458 | T8=2.134 | S5=15.209 | ND8=1.75496 | $\nu 8$=27.57 |
| | R13=—7.316 | | | | |
| IX | R14=7.807 | T9=1.807 | | ND9=1.61328 | $\nu 9$=44.28 |

It will be apparent that the foregoing absolute values are variable depending on the value of F. Other forms are thus possible and changes may be made in the values of the constructional data based on the relationships in the first of the above charts, without departing from the spirit of this invention.

What I claim is:

1. An achromatic microscope objective having a magnification of substantially 100X and a numerical aperture of substantially 1.25 for forming an image of an object plane, said image being well corrected for spherical and chromatic aberrations, coma, astigmatism and curvature of image field, said objective comprising:
    a front planoconvex lens member I;
    a second concavo-convex lens member II;
    said front and second members forming a doublet;
    a third concavo-convex lens member III;
    a fourth convex-concavo lens member IV;
    a fifth double convex lens member V;
    said fourth and fifth members forming a doublet;
    a sixth convex-concavo lens member VI;
    a seventh double convex lens member VII;
    said sixth and seventh members forming a doublet;
    an eighth double convex lens member VIII;
    a ninth double concave lens member IX;
    said eighth and ninth members forming a doublet;
    all of said lens members being axially aligned; and
    the parameters of lens radii (R1—R14), lens thicknesses (T1—T9), axial spaces among lens elements and object plane (S1—S5), refractive indices (ND1—ND9), and Abbé numbers ($\nu 1 - \nu 9$), being determined by the following relationship:

| Lens | Radius (R) | Thickness (T) | Space (S) | Refractive index (ND) | Abbé Number ($\nu$) |
|---|---|---|---|---|---|
| | | | S1=.1696F | | |
| I | R1=Plano | T1=.3173F | | ND1=1.51700 | $\nu 1$=64.54 |
| II | R2=−.9047F | T2=1.5971F | | ND2=1.96028 | $\nu 2$=34.92 |
| | R3=−1.5254F | | S2=.0109F | | |
| III | R4=−6.1208F | T3=1.1183F | | ND3=1.78833 | $\nu 3$=50.47 |
| | R5=−3.3808F | | S3=.1641F | | |
| IV | R6=8.7525F | T4=.6702F | | ND4=1.80491 | $\nu 4$=25.42 |
| V | R7=4.4548F | T5=2.5595F | | ND5=1.48651 | $\nu 5$=84.46 |
| | R8=−4.4548F | | S4=.0279F | | |
| VI | R9=14.2190F | T6=.6374F | | ND6=1.80491 | $\nu 6$=25.42 |
| VII | R10=3.1849F | T7=2.7756F | | ND7=1.48651 | $\nu 7$=84.46 |
| | R11=−13.3123F | | S5=8.3214F | | |
| VIII | R12=31.4373F | T8=1.1676F | | ND8=1.75496 | $\nu 8$=27.57 |
| IX | R13=−3.4557F | T9=.9887F | | ND9=1.61328 | $\nu 9$=44.28 |
| | R14=4.2715F | | | | | wherein scalar values are given in millimeters.

2. An achromatic microscope objective having a magnification of substantially 100X and a numerical aperture of substantially 1.25 for forming an image of an object plane, said image being well corrected for spherical and chromatic aberrations, coma, astigmatism and curvature of image field, said objective comprising:
    a front planoconvex lens member I;
    a second concavo-convex lens member II;
    said front and second members forming a doublet;
    a third concavo-convex lens member III;
    a fourth convex-concavo lens member IV;
    a fifth double convex lens member V;
    said fourth and fifth members forming a doublet;
    a sixth convex-concavo lens member VI;
    a seventh double convex lens member VII;
    said sixth and seventh members forming a doublet;
    an eighth double convex lens member VIII;
    a ninth double concave lens member IX;
    said eighth and ninth members forming a doublet;
    all of said lens members being axially aligned; and
    the parameters of lens radii (R1—R14), lens thicknesses (T1—T9), axial spaces among lens elements and object plane (S1—S5), refractive indices (ND1—ND9), and Abbé numbers ($\nu 1 - \nu 9$) as follows:

| Lens | Radius (R) | Thickness (T) | Space (S) | Refractive index (ND) | Abbé Number ($\nu$) |
|---|---|---|---|---|---|
| | | | S1=.31 | | |
| I | R1=PLANO | T1=.58 | | ND1=1.517 | $\nu 1$=64.54 |
| II | R2=−1.6535 | T2=2.919 | | ND2=1.96028 | $\nu 2$=34.92 |
| | R3=−2.788 | | S2=.02 | | |
| III | R4=−11.187 | T3=2.044 | | ND3=1.78833 | $\nu 3$=50.47 |
| | R5=−6.179 | | S3=.300 | | |
| IV | R6=15.997 | T4=1.225 | | ND4=1.80491 | $\nu 4$=25.42 |
| V | R7=8.112 | T5=4.678 | | ND5=1.48651 | $\nu 5$=84.46 |
| | R8=−8.142 | | S4=.051 | | |
| VI | R9=25.988 | T6=1.165 | | ND6=1.80491 | $\nu 6$=25.42 |
| VII | R10=5.821 | T7=5.073 | | ND7=1.48651 | $\nu 7$=84.46 |
| | R11=−24.331 | | S5=15.209 | | |
| VIII | R12=57.458 | T8=2.134 | | ND8=1.75496 | $\nu 8$=27.57 |
| IX | R13=−6.316 | T9=1.807 | | ND9=1.61328 | $\nu 9$=44.28 |
| | R14=7.807 | | | | | wherein scalar values are given in millimeters.